United States Patent
Ribeiro et al.

(10) Patent No.: US 10,652,936 B2
(45) Date of Patent: May 12, 2020

(54) SHORT IDENTIFIERS FOR DEVICE-TO-DEVICE (D2D) BROADCAST COMMUNICATIONS

(71) Applicant: NOKIA TECHNOLOGIES OY, Espoo (FI)

(72) Inventors: Cássio Barboza Ribeiro, Espoo (FI); Juha Sakari Korhonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 147 days.

(21) Appl. No.: 14/635,670

(22) Filed: Mar. 2, 2015

(65) Prior Publication Data

US 2015/0271857 A1   Sep. 24, 2015

Related U.S. Application Data

(60) Provisional application No. 61/968,705, filed on Mar. 21, 2014.

(51) Int. Cl.

| | | |
|---|---|---|
| *H04W 76/11* | (2018.01) | |
| *H04W 76/14* | (2018.01) | |
| *H04W 4/70* | (2018.01) | |
| *H04W 72/12* | (2009.01) | |
| *H04W 4/06* | (2009.01) | |
| *H04W 76/40* | (2018.01) | |

(52) U.S. Cl.
CPC .............. *H04W 76/11* (2018.02); *H04W 4/70* (2018.02); *H04W 72/12* (2013.01); *H04W 76/14* (2018.02); *H04W 4/06* (2013.01); *H04W 76/40* (2018.02)

(58) Field of Classification Search
None
See application file for complete search history.

(56) References Cited

U.S. PATENT DOCUMENTS 7,260,400 B2 *  8/2007  Chang ............... H04W 36/0011
                                                370/331
8,526,986 B2 *  9/2013  Fischer ............. H04W 74/0866
                                                370/470

(Continued)

FOREIGN PATENT DOCUMENTS

CN      102067636 A     5/2011
CN      103493567 A     1/2014

(Continued)

OTHER PUBLICATIONS

Qualcomm Incorporated, "Study on LTE Device to Device Proximity Services", RP-122009, 3 GPP TSG RAN Meeting #58.

(Continued)

*Primary Examiner* — Hicham B Foud
(74) *Attorney, Agent, or Firm* — Squire Patton Boggs (US) LLP (57) ABSTRACT

Methods, apparatuses, systems, and computer program products for transmitting/receiving scheduling assignment(s) (SAs) are provided. One method is directed to including a short version of a target ID (i.e., short ID) in a SA. The method may also include transmitting the SA including the short ID to one or more monitoring UE(s). The monitoring UE(s) may then compare the short ID to target ID(s) being monitored. The corresponding data from the SA may be decoded if there is a match between the short ID and any of the target ID(s).

19 Claims, 3 Drawing Sheets

(56) References Cited

U.S. PATENT DOCUMENTS

| | | | | |
|---|---|---|---|---|
| 9,485,716 | B2* | 11/2016 | Seok | H04W 48/14 |
| 2008/0057972 | A1 | 3/2008 | Doettling et al. | |
| 2008/0096557 | A1* | 4/2008 | Rinne | H04W 8/26 |
| | | | | 455/435.1 |
| 2008/0192622 | A1* | 8/2008 | Scheim | H04L 1/0025 |
| | | | | 370/210 |
| 2010/0135251 | A1* | 6/2010 | Sambhwani | H04W 8/26 |
| | | | | 370/331 |
| 2011/0201365 | A1 | 8/2011 | Segura | |
| 2012/0176983 | A1* | 7/2012 | Iwamura | H04L 1/1893 |
| | | | | 370/329 |
| 2013/0028177 | A1* | 1/2013 | Koskela | H04W 4/005 |
| | | | | 370/328 |
| 2013/0051296 | A1* | 2/2013 | Park | H04W 4/005 |
| | | | | 370/311 |
| 2013/0170345 | A1* | 7/2013 | Merlin | H04W 28/065 |
| | | | | 370/230 |
| 2013/0223210 | A1* | 8/2013 | Asterjadhi | H04L 1/0025 |
| | | | | 370/230 |
| 2013/0287012 | A1* | 10/2013 | Pragada | H04W 76/045 |
| | | | | 370/338 |
| 2013/0329652 | A1* | 12/2013 | Pani | H04W 72/121 |
| | | | | 370/329 |
| 2014/0036878 | A1 | 2/2014 | McNamara et al. | |
| 2014/0086315 | A1* | 3/2014 | Zhang | H04N 19/172 |
| | | | | 375/240.12 |
| 2014/0161126 | A1* | 6/2014 | Asterjadhi | H04W 12/02 |
| | | | | 370/392 |
| 2014/0192694 | A1* | 7/2014 | Pantelidou | H04W 52/0216 |
| | | | | 370/311 |
| 2014/0192735 | A1* | 7/2014 | Sridharan | H04W 8/26 |
| | | | | 370/329 |
| 2014/0369263 | A1* | 12/2014 | Vermani | H04W 28/06 |
| | | | | 370/328 |
| 2015/0043455 | A1* | 2/2015 | Miklos | H04W 8/26 |
| | | | | 370/329 |
| 2015/0063246 | A1* | 3/2015 | Zhang | H04W 76/021 |
| | | | | 370/329 |
| 2015/0282143 | A1* | 10/2015 | Kim | H04W 8/005 |
| | | | | 370/329 |
| 2015/0358824 | A1* | 12/2015 | Kim | H04W 4/005 |
| | | | | 726/4 |
| 2015/0365942 | A1* | 12/2015 | Niu | H04W 74/02 |
| | | | | 370/330 |
| 2016/0219636 | A1* | 7/2016 | Fujishiro | H04W 72/02 |
| 2016/0249355 | A1* | 8/2016 | Chae | H04W 72/1263 |
| 2016/0278031 | A1* | 9/2016 | Sorrentino | H04W 56/003 |

FOREIGN PATENT DOCUMENTS

| | | |
|---|---|---|
| RU | 2378770 C2 | 1/2010 |
| RU | 2378778 C2 | 1/2010 |
| RU | 2384021 C2 | 3/2010 |
| WO | 2011/098993 A1 | 8/2011 |
| WO | 2012/104644 A1 | 8/2012 |

OTHER PUBLICATIONS

3GPP TSG-RAN WG1 Meeting #76; R1-140589, "D2D Communication Resource Scheduling", Sony, Feb. 10-14, 2014, 5 pages.
3GPP TSG-RAN WG1 Meeting #75; R1-135805, "On Scrambling of D2D Physical Channels", Ericsson, Nov. 11-15, 2013, 5 pages.
3GPP TSG-RAN WG2 #87bis; Tdoc R2-144470, "ProSe Layer-2 Identifiers", Ericsson, Oct. 6-10, 2014, 5 pages.
3GPP TSG-RAN WG2 #86, R2-142588, "Introduction of ProSe" Qualcomm Incorporated, May 19-23, 2014, 12 pages.
European Search Report application No. 15157916.6-1505, dated Aug. 27, 2015.
Russian Office Action application No. 9-13337 dated May 31, 2016.
Office Action dated Nov. 16, 2017 corresponding to Chinese Patent Application No. 201510125095.4.
Chinese Office Action dated Jun. 27, 2018, issued in corresponding CN Application No. 201510125095.4.
Rejection Decision dated Mar. 27, 2019 corresponding to Chinese Patent Application No. 201510125095.4.
Nov. 23, 2018 Office Action issued in Chinese Patent Application No. 201510125095.4.
Communication pursuant to Article 94(3) EPC issued in corresponding European Patent Application No. 15157916.6, dated Jul. 18, 2019.

* cited by examiner

SHORT IDENTIFIERS FOR DEVICE-TO-DEVICE (D2D) BROADCAST COMMUNICATIONS

CROSS-REFERENCE TO RELATED APPLICATIONS

This application claims priority from U.S. Provisional Application No. 61/968,705, filed on Mar. 21, 2014. The entire contents of this earlier filed application are hereby incorporated by reference in their entirety.

BACKGROUND

1. Field

Certain embodiments generally relate to communication systems, and for example, to device-to-device (D2D) communication integrated into a communications network, such as, but not limited to, long-term evolution (LTE) or long-term evolution advanced (LTE-A) cellular network specified by the 3rd Generation Partnership Project (3GPP).

2. Description of the Related Art

Two types of communication networks include cellular networks and ad-hoc networks. A cellular network is a radio network made up of one or more cells, where each cell is served by at least one centralized controller, such as a base station (BS), a Node B, or an evolved Node B (eNB). In a cellular network, a user equipment (UE) communicates with another UE via the centralized controller, where the centralized controller relays messages sent by a first UE to a second UE, and vice versa. In contrast, in an ad-hoc network, a UE directly communicates with another UE, without the need of a centralized controller. Utilizing a cellular network versus an ad-hoc network has its benefits and drawbacks. For example, utilizing a cellular network over an ad-hoc network provides the benefit of easy physical resource control and interference control. However, utilizing a cellular network over an ad-hoc network also provides the drawback of inefficient physical resource utilization. For instance, additional physical resources may be required in a cellular network when the two UEs are close to each other, as compared to an ad-hoc network.

A hybrid network utilizes both a cellular mode and a device-to-device (D2D) transmission mode. In a hybrid network, a UE may choose to communicate either via a cellular mode or a D2D transmission mode. As an example, a hybrid network may allow UEs to communicate either via a cellular mode (i.e. via a centralized controller) or via a D2D transmission mode where the UEs may establish a direct channel which may or may not be under the control of a centralized controller. The UE and/or its controlling network may make this selection depending on which mode provides better overall performance. Thus, a hybrid network may improve total system performance over a cellular network or an ad-hoc network. However, in order to utilize a hybrid network, issues related to physical resource sharing and interference situations may need to be addressed.

In addition, proximity services (ProSe)/D2D discovery and communication is one of the ongoing study items for 3GPP Release 12 (Rel-12) standardization (as well as Release 13 and beyond). D2D scenarios that are currently being studied in 3GPP include D2D in network coverage, out of network coverage, and partial network coverage scenarios. ProSe direct D2D LTE Rel-12 study item (SI) was approved at RAN #58 and concluded at RAN#63. As mentioned above, the two major topics to incorporate ProSe D2D in LTE specification are discovery and communication.

SUMMARY

One embodiment may include an apparatus including at least one processor and at least one memory including computer program code. The at least one memory and the computer program code may be configured, with the at least one processor, to cause the apparatus at least to include a short identifier (ID), which may be a short version of a target identifier (ID), in a scheduling assignment. The at least one memory and the computer program code may be further configured, with the at least one processor, to cause the apparatus at least to transmit the scheduling assignment including the short ID.

Another embodiment may include a method directed to including, by a UE, a short version of a target identifier (ID) in a scheduling assignment (SA). The method may also include transmitting the SA including the short ID.

Another embodiment may include an apparatus including at least one processor and at least one memory including computer program code. The at least one memory and the computer program code may be configured, with the at least one processor, to cause the apparatus at least to receive a scheduling assignment (SA) from a transmitting UE. In an embodiment, the SA may include a short identifier (ID) that represents a short version of the target identifier (ID). The at least one memory and the computer program code may be configured, with the at least one processor, to cause the apparatus at least to identify the short ID from the SA, to compare the short ID to short IDs corresponding to target IDs being monitored by the apparatus, and to decode the corresponding data from the SA when the short ID matches any of the target IDs.

Another embodiment may be directed to a method that includes receiving, by a UE, a scheduling assignment (SA) from a transmitting UE. In an embodiment, the SA may include a short identifier (ID) that represents a short version of the target identifier (ID). The method may further include identifying the short ID from the SA, and comparing the short ID to short IDs corresponding to target IDs being monitored by the UE. According to one embodiment, the method may also include decoding the corresponding data from the SA when the short ID matches any of the monitored target IDs.

Another embodiment may include an apparatus including at least one processor and at least one memory including computer program code. The at least one memory and the computer program code may be configured, with the at least one processor, to cause the apparatus at least to select a first ID of a UE group (target ID) of a first length, and create a second ID of a second length shorter than the first length from the first ID. The creation of the second ID from the first ID may mean composing the second ID from certain bits of the first ID or using a more complex function that outputs a second ID when the input is the first ID. Alternatively, the creation may mean applying a mapping table that has been configured or signaled beforehand for the apparatus. The second ID may or may not be unique with the area. The at least one memory and the computer program code may then be configured, with the at least one processor, to cause the apparatus at least to transmit the second ID in a scheduling assignment message (which may identify resources to be used for data transmission), and transmit information on the first ID in the resources to be used for data transmission.

An embodiment may include a method that includes selecting a first ID of a UE group (target ID) of a first length, and creating a second ID of a second length shorter than the first length from the first ID. The second ID may or may not be unique within the area. The method may then include transmitting the second ID in a scheduling assignment message (which may identify resources to be used for data transmission), and transmitting information on the first ID in the resources to be used for data transmission.

Another embodiment may include an apparatus including at least one processor and at least one memory including computer program code. The at least one memory and the computer program code may be configured, with the at least one processor, to cause the apparatus at least to derive a second ID of a first ID, where the first ID is unique within an area and the second ID has a shorter size than the first ID and may or may not be unique within an area. The at least one memory and the computer program code may then be configured, with the at least one processor, to cause the apparatus at least to determine, based on the presence of the second ID in at least one received scheduling assignment message, resources for data transmission to decode, decode the resources for data transmission, select data from the resources for data transmission that comprise the first ID, and discard data from the resources for data transmission that do not comprise the first ID.

Another embodiment may include a method that includes deriving a second ID of a first ID, where the first ID is unique within a cell and the second ID has a shorter size than the first ID and may or may not be unique with the cell. The method may then include determining, based on the presence of the second ID in at least one received scheduling assignment message, resources for data transmission to decode, decoding the resources for data transmission, selecting data from the resources for data transmission that comprise the first ID, and discarding data from the resources for data transmission that do not comprise the first ID.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for including a short target ID in a scheduling assignment (SA) message, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are applicable to LTE-Advanced, including 3GPP LTE-A Rel-12, Rel-13 and beyond, which addresses LTE-Advanced support for D2D discovery and communication without limitation to LTE-Advanced. The 3GPP has begun carrying out a study for potential services and requirements for D2D communications, referred to as Proximity Services (ProSe). One objective of this study is to look at use cases and identify potential requirements for an operator network controlled discovery and communications between devices that are in proximity, under continuous network control, and/or are under 3GPP network coverage. This could be for the purposes of commercial/social use, network offloading, public safety, and/or integration of current infrastructure services to assure the consistency of the user experience including reachability and mobility aspects.

It has been agreed in RAN1#76 that every D2D transmitter is supposed to send a scheduling assignment (SA) message that provides information necessary for decoding of data transmissions. For example, it is possible that the SA message explicitly indicates the resources to be used for data transmission, the amount of repetitions used for data transmissions, the modulation and coding scheme, among other information. For the sake of improved coverage for Public Safety applications, it is also assumed that D2D data transmissions will include several repetitions, such as four or eight repetitions, for example. Therefore, it is important that the SA message provides enough information for the UEs to be able to know how to combine the data transmissions in order to obtain the coverage benefits.

It has been agreed as well that the layer-2 (L2) ID of the target UE or group of UEs is transmitted as a medium access control (MAC) level information. This basically implies that UEs will only be able to identify the target of a certain data transmission after successful decoding of the data itself. Given that many UEs may be transmitting data at the same time, the receiving UEs would need to receive all transmitted data before deciding if any of those are relevant for them.

Including the L2 ID of the target UE or group of UEs in the SA message is a way of addressing this problem, but this implies that the ID field size will have to be constrained in order to avoid significant overhead in SA message, which may limit the number of UEs and groups to be supported in a certain area. This is especially problematic considering out-of-coverage operation, where it is not possible to rely on the network to provide short temporary identifiers that are unique in a certain area.

Embodiments of the invention address the problem of how to include a target ID in the SA message to reduce the decoding load of the UE(s), while at the same timesaving signaling overhead in SA message.

One of the potential benefits of including target IDs to SAs is that a UE can save power by avoiding trying to decode data transmissions that are not relevant for that particular UE. It can be assumed that decoding of a SA is a light operation compared with decoding of data transmissions: the number of decoded bits is larger for data transmission (more processing is needed) and also transmission duration for data may be longer (longer receiver active time is needed). To maximize the benefits, transmission of scheduling assignments by different UEs should be aligned in time domain.

Since SA messages add overhead to the data transmission, it may be desirable to minimize their size. Moreover, coverage of the SA messages themselves need to be at least as good as the data transmissions that they are identifying, and hence repetition of the SA messages themselves might be required. In order to maximize coverage, it may be important to use narrow bandwidth for such transmission, as wider band transmissions would suffer from lower power density. In case of LTE-A, the narrow bandwidth could mean 1-3 physical resource blocks (PRBs). Therefore, it may not be desirable to add long identifiers to the SA messages, as this would imply significant spectral efficiency losses. Specifying short SAs would be especially important in systems where UEs obtain resources for SA messages in a contention based manner from resources separate from the data resources. With contention based allocation, it is essential to have a large number of SA resources in order to avoid excessive collisions of SA messages. Therefore, the shorter the SA messages are, the more SA resources can be allocated, and the better the system performs in terms of collisions.

In D2D public safety (PS) applications, the UEs may be required to be able to receive data directed to more than one communication group at the same time, in which case it is expected that the D2D equipped UEs would be able to receive multiple SAs for decoding more than one data communication packet at the same time. For example, the UEs may be required to monitor a general broadcast communication group for emergency transmissions, while at the same time monitoring the communications of the group it is assigned to. The configuration of groups, use cases for each group, and corresponding IDs is the responsibility of the PS operator.

As will be discussed in detail below, an embodiment provides that, in addition to the current 3GPP agreement of L2 target ID (i.e., long ID) being included in MAC PDU header, a transmitting UE includes a short target ID in SA message which may be transmitted in separate resources from the data or may be piggybacked with data. Then, the short ID may be used to reduce processing overhead for D2D receiving UEs and also to allow the receiving UEs to switch off the receiver for times where there is no relevant transmissions occurring. The long ID may still be used to uniquely identify transmissions that are relevant for the target receiving UEs. In some embodiments, the short ID can be generated either by taking bits at any pre-defined position of the long IDs, or by performing some mathematical operation on the long ID. In some other embodiments, instead of using a general rule for mapping short identities from the long identities, the short identities could be configured or allocated beforehand. This alternative could be most relevant when configuration or allocation of identities is done for a limited set of long identities e.g. when the identities represent Public Safety communication groups.

According to some embodiments of the invention, the following assumptions may be made:
 a) The UEs are pre-configured with IDs of relevant communication groups, which can be used for 1:M or 1:1 communications;
 b) At a certain point of time the UEs are configured to monitor communications in a limited number of groups, for example defined by manual selection by the user;
 c) The target ID may be transmitted as, for example, MAC-level information. This is only available for the UE receiver after successfully decoding the data itself; and
 d) The target ID may be relatively large, for example between 16 and 48 bits.

Given the assumptions discussed above, certain embodiments may include the following steps:
 1) The transmitting UE includes in the scheduling assignments (SAs) a short identifier comprising a short version of the target ID, obtained for example by taking the 5 least significant bits of the target ID. This is denoted herein as short ID.
 2) The UEs monitoring scheduling assignments read the short IDs and compare it to the short IDs corresponding to target IDs that it is supposed to monitor. In some embodiments, the comparison may mean simple checking if the bits of the short ID matches with some bits, like the five least significant bits of the monitored target IDs. In some other embodiments, when the short IDs are obtained from the long ID in a more complex manner, the comparison may mean comparing the received short ID with the short IDs corresponding to the target IDs.
 3) For all those SAs whose short IDs match any of the target IDs it is supposed to monitor, the UE will attempt to decode the corresponding data. Here, the matching of short ID and target ID is understood to mean that the short ID is equal to the short ID associated with the target ID.

In an embodiment, there is a possibility of ambiguity in the short IDs, but this will not cause any collision or missing information, as the UEs would still be able to decode the data transmissions and then identify the unambiguous data transmission from the received data. However, certain embodiments of the invention do allow for a trade-off between the amount of data decoding required by the UEs and the amount of uniquely identified targets.

In the United States, the public safety (PS) requirements specify that 20 groups should be allowed to communicate simultaneously in a typical scenario, which in the worst case could be in the order of 60 groups. With 5 bits for the short ID, i.e. 32 IDs, the probability that the UE would have to decode more than one transmission following a SA can be made very small by reasonable planning of the IDs.

For out-of-coverage operation it is not possible to assume that the network operator would be able to assign and re-assign temporary IDs, and hence it is possible that relatively large IDs have to be assigned to the communication groups. For the sake of example, consider the following group IDs:

Group A: 1010101010101010101010101010101
Group B: 1111100000111100001101011000000001
Group C: 1101010101101100110000011111010001

From the example above, it is clear that in case the 5 LSBs are transmitted with the SA message, the receiving UEs would identify the following short target IDs: 10101, 00001, 10001. In this case, a UE tracking transmissions from any of those groups would be able to identify if there is any data to receive in the resources used for data transmission, and which ones exactly.

Further, in the example above, if only the 3 LSBs are transmitted in the SA message, the receiving UEs would identify the following short target IDs: 101, 001, 001. In this case, the UEs tracking messages to groups B or C are not able to uniquely identify transmissions that are relevant for them. This implies extra decoding effort and potentially less power saving opportunities, but no collisions on those resources, and hence the UEs are able to decode the data transmissions and identify if they are relevant or not. Although some ambiguity remains in this case, there is still significant improvement compared to the situation where no ID is provided or if the full ID has to be included in the SA message itself.

It should be noted that there are many different forms in which the short ID could be generated. For example, the short ID may be generated by taking bits at any pre-defined position of the long IDs, or by performing some mathematical operation on the long ID. For yet another example, short IDs could be connected to long IDs through beforehand provided mapping table from long IDs to short IDs. Such mapping table does not remove the need of long identities since, because of lack of short IDs, a short ID may correspond to multiple communication groups or UEs. The beforehand provided mapping table could be valid locally and signaled through the network or it could be written to UEs when they are configured for a particular PS system.

At least in principle, when allocating the identities, the PS operator or other could try to minimize the target ID ambiguity by taking care that the groups, operating in the same area, are distinguishable as far as possible based on the short target IDs.

Figure 1:
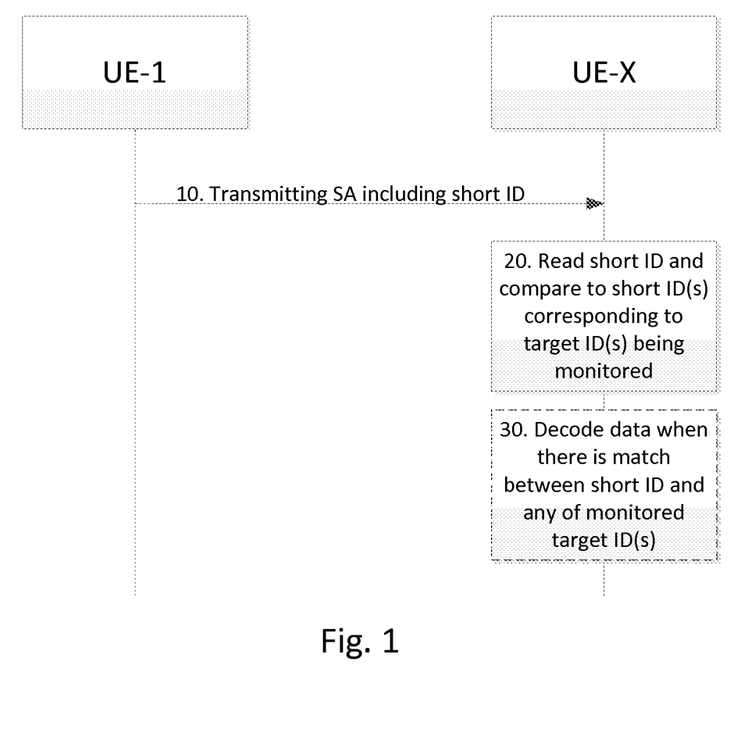
FIG. 1 illustrates an example signaling diagram, according to one embodiment.

FIG. 1 illustrates an example signaling diagram according to one embodiment of the invention. As illustrated in the example of FIG. 1, a transmitting UE, UE-1, transmits, at 10, a SA including a short version of a target ID (i.e., short ID). Then, one or more monitoring UEs, UE-X, reads, at 20, the short ID and compares it to short IDs corresponding to the target IDs being monitored. For any of the SAs with short IDs that match any of the target IDs UE-X are supposed to monitor, at 30, the UE-X will attempt to decode the corresponding data.

Figure 2A:
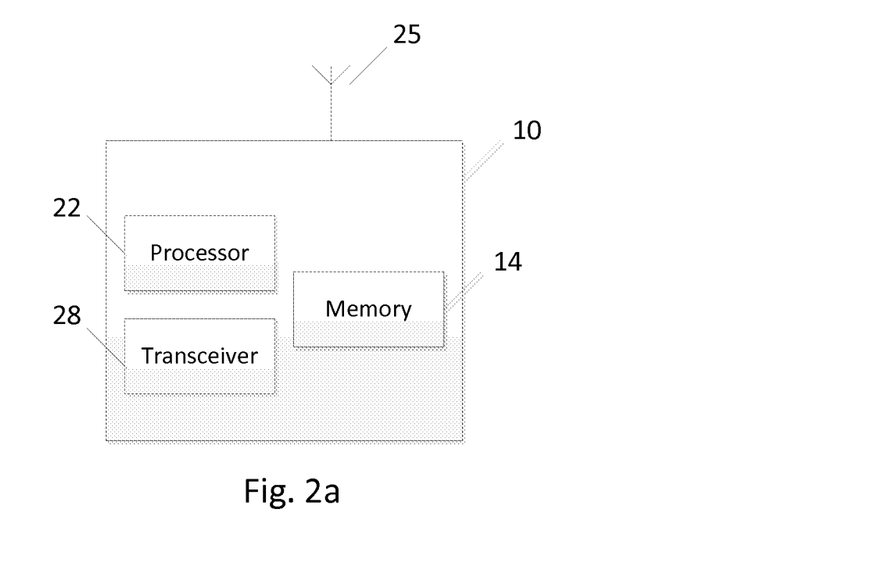
FIG. 2a illustrates an apparatus, according to one embodiment.

FIG. 2a illustrates an example of an apparatus 10 according to an embodiment. In an embodiment, apparatus 10 may be a node, host, or server in a communications network or serving such a network. In this example, apparatus 10 may be a UE in a communications network, such as LTE or LTE-A. It should be noted that one of ordinary skill in the art would understand that apparatus 10 may include components or features not shown in FIG. 2a.

As illustrated in FIG. 2a, apparatus 10 may include a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further comprise or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also comprise or be coupled to one or more antennas 25 for transmitting and receiving signals and/or data to and from apparatus 10. Apparatus 10 may further comprise or be coupled to a transceiver 28 configured to transmit and receive information. The transceiver may be an external device, such as a remote radio head. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

As mentioned above, according to one embodiment, apparatus 10 may be a UE in a communications network, such as LTE or LTE-A. In one embodiment, apparatus 10 may be controlled by memory 14 and processor 22 to include a short version of a target ID in a SA. In some embodiments described herein, the short version of the target ID may be referred to as a short ID. According to an embodiment, apparatus 10 may be controlled by memory 14 and processor 22 to transmit the SA including the short ID to one or more monitoring UE(s).

Figure 2B:
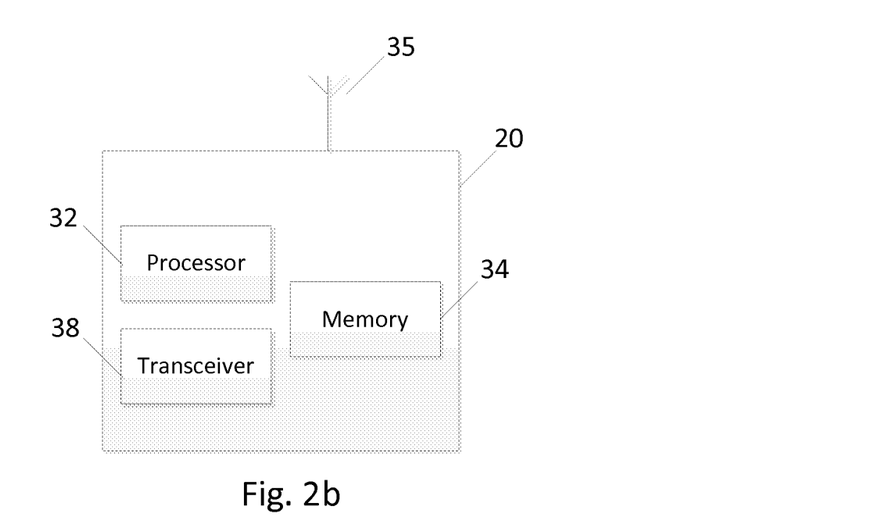
FIG. 2b illustrates an apparatus, according to another embodiment.

FIG. 2b illustrates an example of an apparatus 20 according to an embodiment. In an embodiment, apparatus 20 may be a node, host, server or base station in a communications network or serving such a network. In this embodiment, apparatus 20 may be UE in a communications network, such as LTE or LTE-A. It should be noted that one of ordinary skill in the art would understand that apparatus 20 may include components or features not shown in FIG. 2b.

As illustrated in FIG. 2b, apparatus 20 may include a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also comprise or be coupled to one or more antennas 35 for transmitting and receiving signals and/or data to and from apparatus 20. Apparatus 20 may further comprise or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a UE in a communications network, such as LTE or LTE-A. In one embodiment, apparatus 20 may be controlled by memory 34 and processor 32 to receive a SA from a transmitting UE. In an embodiment, the SA may include a short ID that represents a short version of the target ID. Apparatus 20 may then be controlled by memory 34 and processor 32 to read the short ID from the SA and to compare the short ID to target IDs being monitored by apparatus 20. According to one embodiment, apparatus 20 may be further controlled by memory 34 and processor 32 to decode the corresponding data from the SA when the short ID matches any of the target IDs.

Figure 3A:
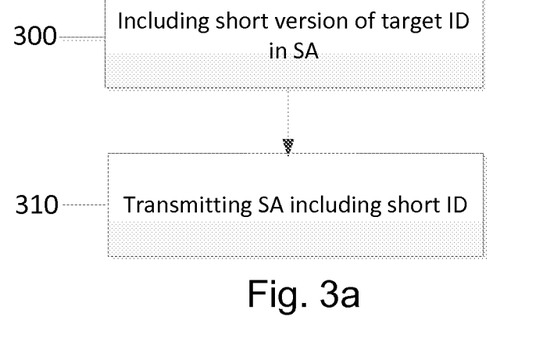
FIG. 3a illustrates a flow diagram of a method, according to an embodiment.

FIG. 3a illustrates an example flow diagram of a method for transmitting SAs, according to one embodiment. In some embodiments, the method may be performed by a UE. The method of FIG. 3a may include, at 300, including a short version of a target ID (i.e., short ID) in a SA. The method may also include, at 310, transmitting the SA including the short ID to one or more monitoring UE(s).

Figure 3B:
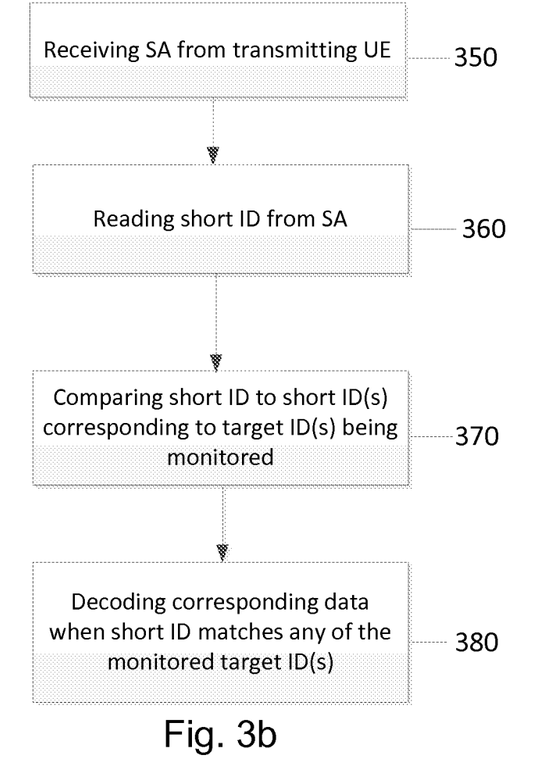
FIG. 3b illustrates a flow diagram of a method, according to another embodiment.

FIG. 3b illustrates an example flow diagram of a method for receiving SAs, according to one embodiment. In some embodiments, the method may be performed by a UE. The method of FIG. 3b may include, at 350, receiving a SA from a transmitting UE. In an embodiment, the SA may include a short ID that represents a short version of the target ID. The method may further include, at 360, reading the short ID from the SA and, at 370, comparing the short ID to short IDs corresponding to target IDs being monitored by the UE. According to one embodiment, the method may include, at 380, decoding the corresponding data from the SA when the short ID matches any of the target IDs.

In some embodiments, the functionality of any of the methods described herein, such as those illustrated in FIG. 1, 3a, or 3b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Embodiments of the invention may provide several advantages. For example, one advantage may include limiting the number of decoding attempts by the UEs participating in D2D communications. In addition, some embodiments may provide an advantage of limiting the size of target group identifiers in SA messages. Other advantages not mentioned herein may also be achieved by certain embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor; and
   at least one memory including computer program code,
   the at least one memory and the computer program code are configured, with the at least one processor, to cause the apparatus at least to
   generate a short identifier by taking bits from any predefined position of a layer-2 target identifier;
   include the short identifier comprising a short version of the layer-2 target identifier in a scheduling assignment;
   transmit the scheduling assignment comprising the short identifier; and include in a data transmission, corresponding to the scheduling assignment, information on layer-2 target identifier determination;
wherein the layer-2 target identifier is included to be used to uniquely identify a target receiving user equipment (UE) or a target receiving user equipment (UE) group which the data transmission is meant for,
wherein the short identifier is included to be used at the target receiving user equipment (UE) to determine, by comparing with the layer-2 target identifier, if the target receiving user equipment (UE) needs to decode the corresponding data transmission to obtain information for determining the layer-2 target identifier of the data transmission.

2. The apparatus according to claim 1, wherein the at least one memory and the computer program code are further configured, with the at least one processor, to cause the apparatus at least to generate the short identifier by following a preconfigured mapping table connecting target identifiers to short identifiers.

3. The apparatus according to claim 1, wherein the layer-2 target identifier comprises a layer-2 identifier of the target user equipment or the target user equipment (UE) group.

4. The apparatus according to claim 1, wherein the apparatus comprises a device-to-device (D2D) user equipment.

5. The apparatus according to claim 1, wherein the at least one memory and the computer program code are further configured, with the at least one processor, to cause the apparatus at least to generate the short identifier by taking the 5 least significant bits of the target identifier.

6. A method, comprising:
generating a short identifier by taking bits from any pre-defined position of a layer-2 target identifier;
including, by a user equipment, the short identifier comprising a short version of the layer-2 target identifier in a scheduling assignment;
transmitting the scheduling assignment comprising the short identifier; and
including in a data transmission, corresponding to the scheduling assignment, information on layer-2 target identifier determination,
wherein the layer-2 target identifier is included to be used to uniquely identify a target receiving user equipment (UE) or a target receiving user equipment (UE) group which the data transmission is meant for,
wherein the short identifier is included to be used at the target receiving user equipment (UE) to determine, by comparing with the layer-2 target identifier, if the target receiving user equipment (UE) needs to decode the corresponding data transmission to obtain information for determining the layer-2 target identifier of the data transmission.

7. The method according to claim 6, further comprising generating the short identifier by following a preconfigured mapping table connecting target identifiers to short identifiers.

8. The method according to claim 6, wherein the layer-2 target identifier comprises a layer-2 identifier of the target user equipment or the target receiving user equipment (UE) group.

9. The method according to claim 6, further comprising generating the short identifier by taking the 5 least significant bits of the target identifier.

10. An apparatus, comprising:
at least one processor; and
at least one memory including computer program code,
the at least one memory and the computer program code are configured, with the at least one processor, to cause the apparatus at least to
receive a scheduling assignment from a transmitting user equipment, wherein the scheduling assignment comprises a short identifier that represents a short version of a layer-2 target identifier; and
identify the short identifier from the scheduling assignment,
wherein the short identifier is generated by taking bits from any pre-defined position of the layer-2 target identifier; and
receive, in a data transmission, corresponding to the scheduling assignment, information for determining layer-2 target identity of the data transmission,
wherein the layer-2 target identifier is received to be used to uniquely identify transmissions that are meant for the apparatus,.
wherein the short identifier is received to be used at the apparatus to determine, by comparing with the layer-2 target identifier, if the apparatus needs to decode the corresponding data transmission to obtain information for determining the layer-2 target identifier of the data transmission.

11. The apparatus according to claim 10, wherein the at least one memory and the computer program code are further configured, with the at least one processor, to cause the apparatus at least to compare the short identifier to short identifiers corresponding to target identifiers being monitored by the apparatus.

12. The apparatus according to claim 10, wherein the at least one memory and the computer program code are further configured, with the at least one processor, to cause the apparatus at least to decode a data transmission corresponding to the scheduling assignment with the short identifier that matches a target identifier being monitored by the apparatus.

13. The apparatus according to claim 10, wherein the apparatus comprises a device-to-device (D2D) user equipment.

14. A method, comprising:
receiving, by a user equipment, a scheduling assignment from a transmitting user equipment, wherein the scheduling assignment comprises a short identifier that represents a short version of a layer-2 target identifier;
identifying the short identifier from the received scheduling assignment,
wherein the short identifier is generated by taking bits from any pre-defined position of the layer-2 target identifier; and
receiving, in a data transmission, corresponding to the scheduling assignment, information for determining layer-2 target identity of the data transmission,
wherein the layer-2 target identifier is received to be used to uniquely identify transmissions that are meant for the user equipment,.
wherein the short identifier is received to be used at the user equipment to determine, by comparing with the layer-2 target identifier, if the user equipment needs to decode the corresponding data transmission to obtain information for determining the layer-2 target identifier of the data transmission.

15. The method according to claim 14, further comprising comparing the short identifier to short identifiers corresponding to target identifiers being monitored by the user equipment.

16. The method according to claim 15, further comprising decoding a data transmission corresponding to the scheduling assignment with the short identifier that matches a target identifier being monitored by the user equipment.

17. An apparatus, comprising:
at least one processor; and
at least one memory including computer program code,
the at least one memory and the computer program code are configured, with the at least one processor, to cause the apparatus at least to
select a first layer-2 identifier of a user equipment group of a first length;
create a second identifier of a second length that is shorter than the first length from the first layer-2 identifier, wherein the second identifier is composed from certain bits of the first layer-2 identifier;
transmit the second identifier in a scheduling assignment message; and
transmit, in resources to be used for data transmission, information on the first layer-2 identifier,
wherein the first layer-2 identifier is configured to be used to uniquely identify transmissions that are meant for target receiving user equipment (UEs),
wherein the second identifier is transmitted to be used at the target receiving user equipment (UE) to determine, by comparing with the first layer-2 identifier, if the target receiving user equipment (UE) needs to decode the corresponding data transmission to obtain information for determining the first layer-2 identifier of the data transmission.

18. The apparatus according to claim 17, wherein the at least one memory and the computer program code are further configured, with the at least one processor, to cause the apparatus at least to:
apply a mapping table that has been configured or signaled beforehand for the user equipment.

19. The apparatus according to claim 17, wherein the first identifier comprises a target identifier.

\* \* \* \* \*